United States Patent
Heath et al.

(10) Patent No.: US 8,949,521 B1
(45) Date of Patent: Feb. 3, 2015

(54) ACTUATOR PREPOSITIONING FOR DISK DRIVE

(71) Applicant: Western Digital Technologies, Inc., Irvine, CA (US)

(72) Inventors: Mark A. Heath, Oklahoma City, OK (US); Travis D. Fox, Edmond, OK (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/907,347

(22) Filed: May 31, 2013

Related U.S. Application Data

(60) Provisional application No. 61/810,472, filed on Apr. 10, 2013.

(51) Int. Cl.
*G11B 19/02* (2006.01)
*G11B 21/08* (2006.01)

(52) U.S. Cl.
CPC .................................... *G11B 21/08* (2013.01)
USPC ............................................. 711/112; 360/69

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |
| 6,337,778 B1 | 1/2002 | Gagne | |
| 6,369,969 B1 | 4/2002 | Christiansen et al. | |
| 6,384,999 B1 | 5/2002 | Schibilla | |
| 6,388,833 B1 | 5/2002 | Golowka et al. | |
| 6,405,342 B1 | 6/2002 | Lee | |
| 6,408,357 B1 | 6/2002 | Hanmann et al. | |

(Continued)

*Primary Examiner* — K. Wong

(57) ABSTRACT

A target location for an actuator of a disk drive is determined for prepositioning the actuator before receiving a command from a host. The target location is determined based on at least one of a characteristic of the disk drive, recent command activity of the host, and information provided by the host. The actuator is moved toward the target location to preposition the actuator.

20 Claims, 4 Drawing Sheets

(56) References Cited

U.S. PATENT DOCUMENTS

| | | |
|---|---|---|
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,925,539 B2 * | 8/2005 | Mowery et al. ............... 711/158 |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,934,802 B2 * | 8/2005 | Cornaby et al. ............... 711/113 |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,423 B2 * | 11/2005 | Coker et al. ................... 711/113 |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |

(56) References Cited

U.S. PATENT DOCUMENTS

| | | |
|---|---|---|
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,411,760 B2 | 8/2008 | Auerbach |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |

(56) References Cited

U.S. PATENT DOCUMENTS

| | | |
|---|---|---|
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 * | 1/2014 | Heath et al. .................. 711/103 |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

* cited by examiner

ACTUATOR PREPOSITIONING FOR DISK DRIVE

CROSS-REFERENCE TO RELATED APPLICATION

This application claims the benefit of U.S. Provisional Application No. 61/810,472, filed on Apr. 10, 2013, which is hereby incorporated by reference in its entirety.

BACKGROUND

Disk drives are often used to write data on or to read data from a recording media. A disk drive can include multiple rotating magnetic disks with tracks for storing data and heads to read data from the disks and/or to write data on the disks. The disks are typically arranged in a stacked configuration with the heads arranged in a corresponding stacked assembly referred to as a head stack assembly (HSA). The HSA can be attached to an actuator that is typically moved by a voice coil motor (VCM). This arrangement ordinarily allows for positioning of the head to read data from or to write data on an adjacent surface of one of the disks in the stack.

One problem encountered by disk drives is a long seek time which includes the amount of time it takes to move the actuator to a target location in order to read or write data in accordance with a read or write command received from a host. This problem is worsened when the actuator must move or seek over a relatively far distance across the disk. Such seek delays can decrease the overall performance of the disk drive.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
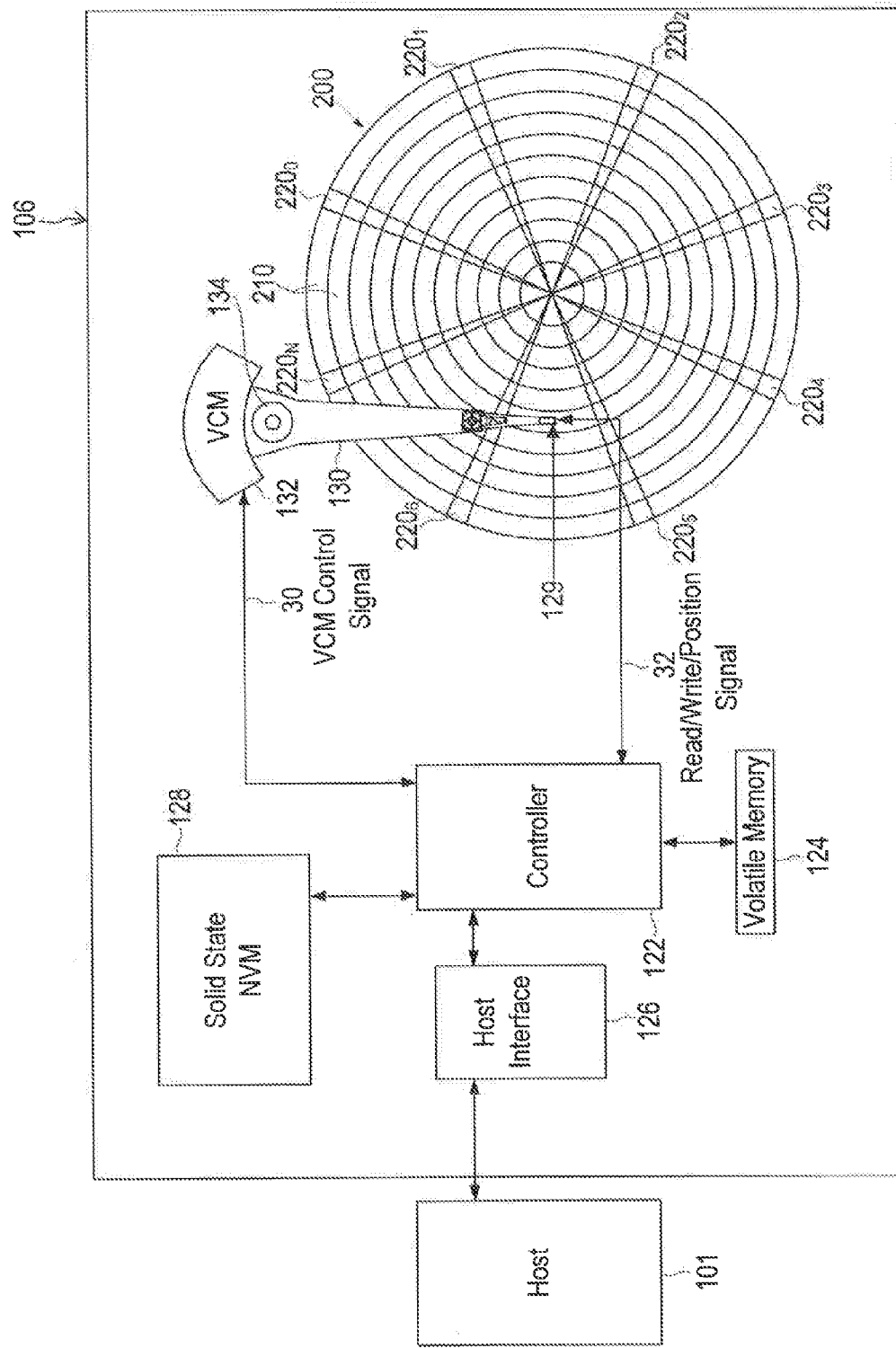
FIG. 1 is a block diagram depicting a disk drive according to an embodiment.

FIG. 1 illustrates a block diagram including host 101 in communication with disk drive 106. Host 101 and disk drive 106 can form, for example, a computer system (e.g., desktop, mobile/laptop, tablet, smartphone, etc.) or other electronic device. In the example of FIG. 1, disk drive 106 is a hybrid drive including two types of non-volatile memory (NVM), i.e., magnetic disk 200 and solid state NVM 128. In other embodiments, disk drive 106 may not include solid state NVM 128.

As shown in FIG. 1, disk drive 106 includes controller 122 which can perform various operations of disk drive 106 described herein. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

In the example of FIG. 1, disk drive 106 includes rotating magnetic disk 200 and head 129 connected to the distal end of actuator 130 which is rotated about pivot 134 by voice coil motor (VCM) 132 to position head 129 over disk 200. Head 129 includes at least a read element (not shown) for reading data from disk 200, and a write element (not shown) for writing data on disk 200.

Disk 200 comprises a number of radial spaced, concentric tracks 210 for storing data. In addition, disk 200 includes a plurality of angularly spaced servo wedges $220_0$-$220_N$, each of which may include embedded servo information that can be read from disk 200 by head 129 to determine the position of head 129 over disk 200. For example, each servo wedge $220_0$-$220_N$ may include a pattern of alternating magnetic transitions (servo burst), which may be read from disk 200 by head 129 and transmitted as position signal 32 for processing by controller 122 to measure the position of head 129 in relation to disk 200. The angular spacing between servo wedges $220_0$-$220_N$ may be uniform, as shown in the example of FIG. 1.

Disk drive 106 also includes solid state NVM 128 for storing data. While the description herein refers to solid state NVM generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Volatile memory 124 can include, for example, a DRAM. Data stored in volatile memory 124 can include data read from disk 200 (e.g., portions of user data), data to be written to disk 200, and/or instructions for disk drive 106, such as instructions loaded into volatile memory 124 from a disk drive firmware.

Host interface 126 is configured to interface disk drive 106 with host 101 and may interface according to a standard such as, for example, PCI express (PCIe), serial advanced technology attachment (SATA), or serial attached SCSI (SAS). As will be appreciated by those of ordinary skill in the art, host interface 126 can be included as part of controller 122. Although FIG. 1 depicts the co-location of host 101 and disk drive 106, in some embodiments the two need not be physically co-located. In some embodiments, disk drive 106 may be located remotely from host 101 and connected to host 101 via a network interface.

In operation, controller 122 writes data to and reads data from disk 200 in response to commands from host 101. To write data to disk 200, controller 122 positions head 129 over disk 200 by sending VCM control signal 30 (e.g., control current) to VCM 132 which moves actuator 130 to a target location. Controller 122 processes data to be written to disk 200 into write signal 32, which is output to head 129. For its part, head 129 converts write signal 32 into a magnetic field that magnetizes the surface of disk 200 based upon write signal 32, thereby magnetically writing data on disk 200. Controller 122 may notify host 101 after data for the write command has been successfully written on disk 200.

When controller 122 receives a read command from host 101 requesting data written on disk 200, controller 122 positions head 129 over disk 200 by sending VCM control signal 30 to VCM 132 which moves actuator 130 to a target location. Head 129 then generates read signal 32 based upon the magnetization of the disk surface under head 129 and controller 122 processes read signal 32 into data.

As discussed in more detail below with reference to FIGS. 2 to 4B, by prepositioning actuator 130 before receiving a command from host 101, it is ordinarily possible to improve performance of disk drive 106. In particular, a target location can be determined based on a predefined set of parameters and/or fixed or adaptive heuristics in view of the current host workload and operating mode. Prepositioning the actuator toward the target location ordinarily improves performance for the current host workload by decreasing physical data access time.

Many workloads to a disk drive have varying levels of logical and physical command access locality and often times have measurable variation in the arrival rate of these commands, even at very shallow host queue depths. If the disk drive is not currently actively servicing a pending host command and there is some level of delay from the host for a new command to execute, it is often beneficial to determine a likely expected location for the next command that will be received from the host and preposition (or start to move) the actuator to a location that will decrease physical access time to the next command, thus increasing throughput.

Figure 2:
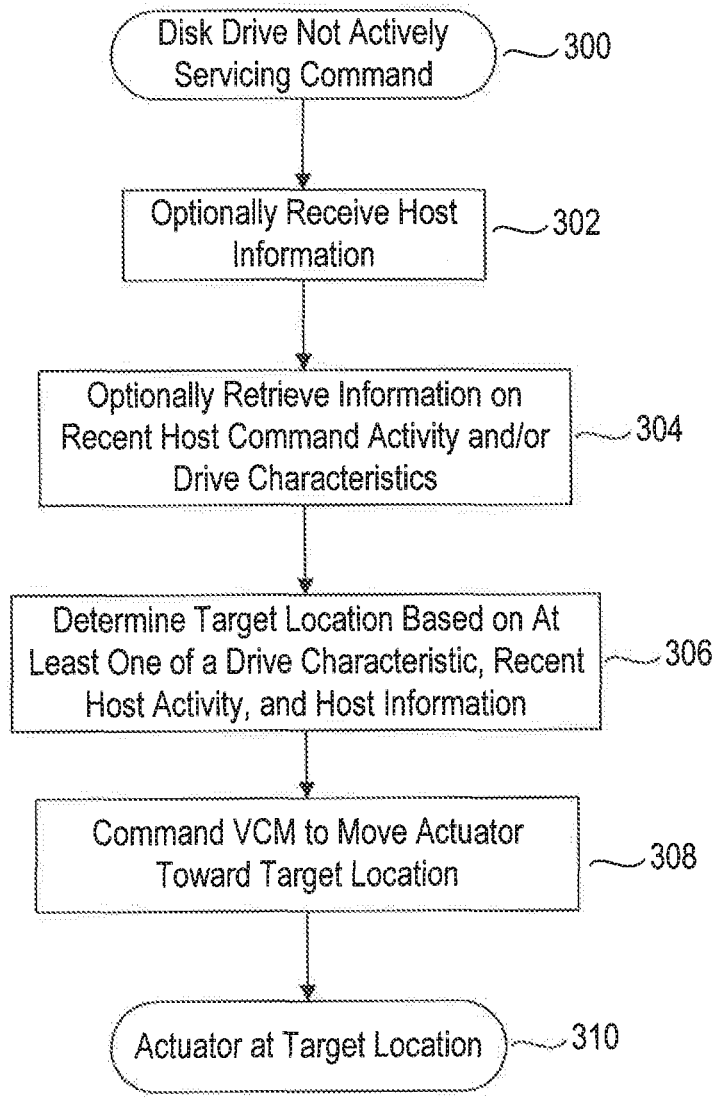
FIG. 2 is a flowchart for an actuator prepositioning process according to an embodiment.

FIG. 2 is a flowchart for an actuator prepositioning process which can be performed by controller 122. The process of FIG. 2 begins in block 300 while disk drive 106 is not actively servicing a command, such as a read or write command received from host 101. In addition, controller 122 may wait a threshold period of time at block 300 after performing a previous command from host 101. The threshold period can vary, for example, based on an average benefit such as an average reduction in time to perform a command with prepositioning as compared to a penalty for prepositioning in the wrong direction such as a worst case or average seek time penalty for prepositioning in the wrong direction. If disk drive 106 has the capability to abort an active seek command during prepositioning, the threshold period may be reduced since the seek time penalty will be reduced.

In block 302, disk drive 106 may optionally receive host information from host 101 which can include hinting from host 101 using a hinting protocol or custom command. Host Information can include information sent from host 101 such as a location for expected future command activity (e.g., a logical block address range) or a priority for a certain type of data, such as file system metadata. As discussed below with reference to block 306, such host information can be used to Identify an expected centroid on disk 200 for future command activity and/or higher priority regions on disk 200 where reduced data access times are more valuable to host 101.

In block 304, disk drive 106 may optionally retrieve information on recent host command activity and/or characteristics of disk drive 106. Examples of information on recent host command activity can include recent activity of disk drive 106, such as the last twenty commands performed by disk drive 106 with location information. The activity information can identify "hot spots" on disk 200 where most of the recent activity has taken place and can include locations on disk 200 (e.g., bands of activity, centroid of recent activity, results from a self-learned behavior by a higher-order algorithm) for each of the various types of commands of a determined recent activity period. The activity information may also include pending or active host commands that are queued for performance by disk drive 106, relationships to current or recent streams as determined by stream-detection logic (e.g., whether it is part of a data stream), and scheduled background activity. In the example of scheduled background activity, this information may provide a location on disk 200 where scheduled background activity is likely to begin or resume.

Information on recent host command activity can also include the level of random, sequential, and/or near sequential activity. Information on sequential activity (e.g., recent sequential writes) can provide a location on disk 200 where the sequential activity left off which can indicate where such sequential activity may resume.

Examples of characteristics of disk drive 106 retrieved in block 304 can include parameters such as a data capacity of disk drive 106, a total quantity of commands that can be queued before execution, and/or a cache size. Disk drive characteristics may also include operational features of disk drive 106, such as whether active seeks can be aborted, which is discussed in more detail below with reference to FIG. 3.

In block 306, controller 122 determines a target location for actuator 130 based on at least one of a disk drive characteristic, recent host command activity, and host information. The disk drive characteristic, recent host command activity and host information can include information obtained in blocks 302 and 304 above. By using static and/or heuristic methods, controller 122 can determine a target location to bias the actuator to a preferred position for servicing a future command from host 101. Since head 129 is mounted on actuator 130, the target location can, for example, correspond to a particular location for head 129 relative to a particular track 210 on disk 200.

In one embodiment, disk drive 106 may determine the target location based on the drive characteristic of a capacity of disk drive by setting the target location such that head 129 would be prepositioned on disk 200 at a midpoint of a range for either a total available data capacity of disk 200 or a data capacity previously used on disk 200. As understood by those of ordinary skill in the art, many other target locations can be determined using disk drive characteristics, recent host command activity and/or host information.

In block 308, controller 122 commands VCM 132 via VCM control signal 30 to move actuator 130 toward the target location determined in block 306. The process of FIG. 2 ends in block 310 when actuator 130 reaches the target location.

In some cases, a command from host 101 may be received by disk drive 106 while actuator 130 is in the process of moving toward the target location. In such cases, it may or may not be advantageous to continue moving toward the target location. If an actuator preposition location was identified and the value of prepositioning to the target location is determined to be of higher value, then controller 122 does not interrupt the command to the target location. With specific workload command locality, it may be more advantageous to not abort the current prepositioning seek and schedule the new command with some lower execution priority in accordance with a prioritized command scheduling algorithm in order to improve performance. For example, controller 122 may use hinting from host 101 or historical host command activity to determine that a set of localized or sequential commands is likely to be received from host 101 soon after receiving the new command. In such a situation, controller 122 may determine that prepositioning to the target location is of higher value than servicing the new command. In addition, if the new command is a random write command that can be committed to another type of NVM such as solid state NVM 128, then the new command can be stored in the other type of NVM without having to seek to a new location on the disk.

On the other hand, if the ability to abort active seeks is available, then on early receipt of a high priority command, it might be beneficial to abort the active seek to the target location and/or determine a new target location in consideration of the newly-received command.

Figure 3:
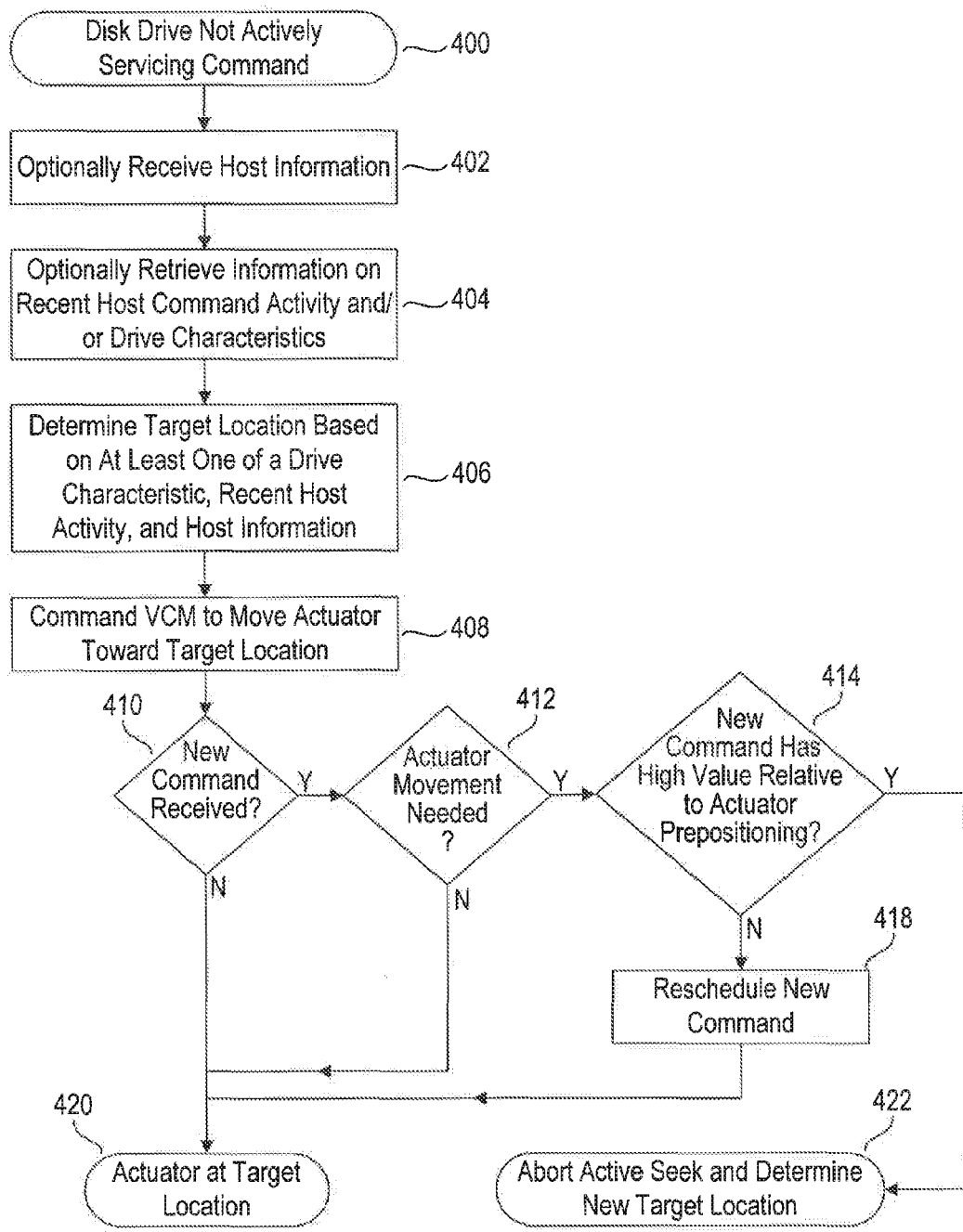
FIG. 3 is a flowchart for an actuator prepositioning process according to another embodiment.

FIG. 3 is a flowchart for an actuator prepositioning process which includes evaluation of a command received after a target location has been determined. An understanding of blocks 400 to 408 can be attained with reference to the description of blocks 300 to 308 described above for FIG. 2. Accordingly, this description is not repeated here.

In block 410, controller 122 checks whether a new command has been received from host 101. If not, actuator 130 continues to move toward the target location until it reaches the target location in block 420.

If a new command is received in block 410, controller 122 determines whether the new command requires movement of actuator 130. In this regard, some new commands may not require movement of actuator 130. In one example, the new command can be a read command for data which is stored in a read cache of disk drive 106 (e.g., a read cache in volatile memory 124). Disk drive 106 can provide such cached data to host 101 without moving actuator 130 over disk 200. In another example, the new command can be a relatively isolated/unrelated write command for a relatively small amount of data. If so, controller 122 can store the data of the new write command in solid state NVM 128 if available instead of moving actuator 130 to store the data on disk 200. Disk drive 106 may also be able to temporarily store data for a new write command to a write cache (e.g., a write cache in volatile memory 124) for later storage to an NVM such as disk 200 or solid state NVM 128. If the new command does not require movement of actuator 130, then actuator 130 continues moving toward the target location until actuator 130 reaches the target location in block 420.

If the new command is determined in block 412 to not require actuator movement, controller 122 determines in block 414 whether the new command has high value relative to actuator prepositioning. As discussed above with reference to block 302 of FIG. 2, some data may be given a high priority, such as file system metadata. Controller 122 in block 414 may determine that the new command has a higher value relative to prepositioning the actuator. If so, controller 122 in block 422 aborts the active seek and determines a new target location in consideration of the new command. On the other hand, if controller 122 determines in block 414 that the new command does not have a high value relative to the actuator prepositioning, controller 122 reschedules the new command with a lower priority in block 418. The process of FIG. 3 then ends in block 420 when the actuator reaches the target location.

Figure 4A:
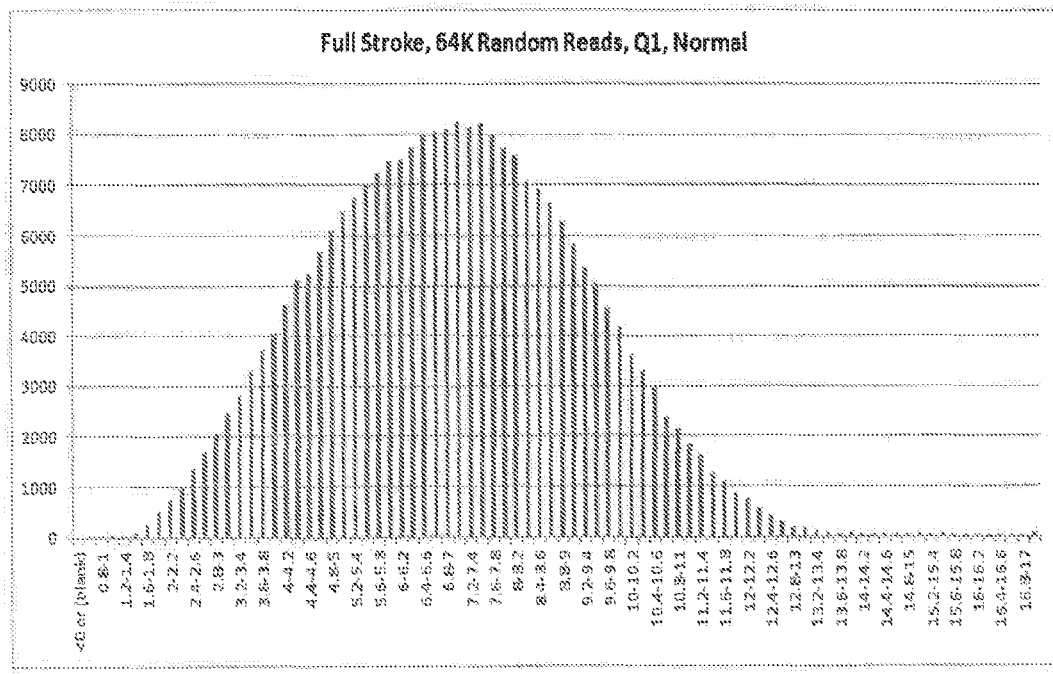
FIG. 4A is a graph depicting a first modeled actuator performance without actuator prepositioning.
Figure 4B:
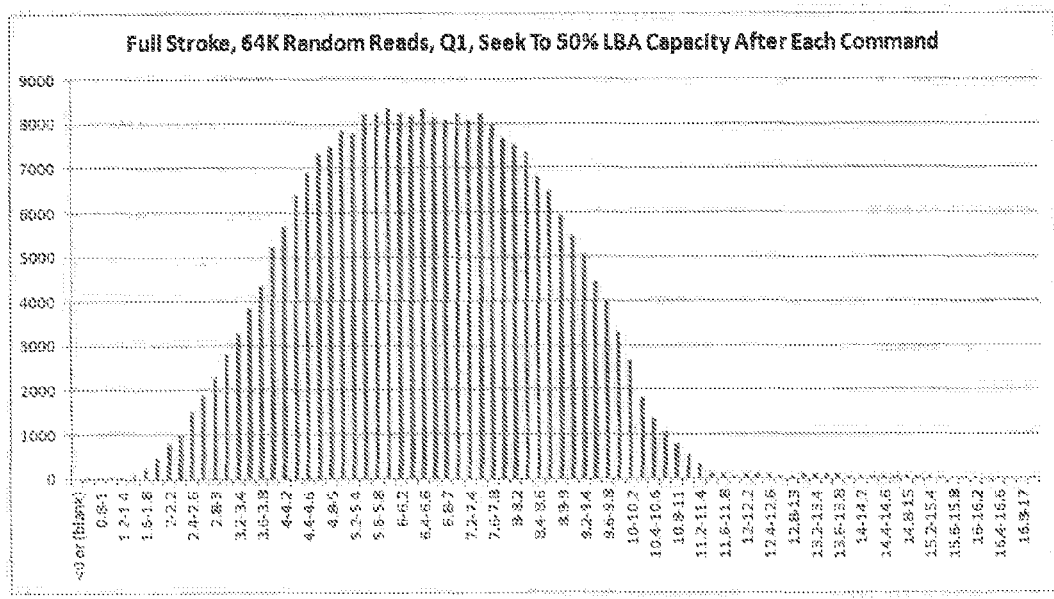
FIG. 4B is a graph depicting a second modeled actuator performance with actuator prepositioning.

By performing actuator prepositioning, it is ordinarily possible to improve disk drive performance under a variety of conditions (i.e., different workloads) without additional component cost. FIGS. 4A and 4B are graphs depicting modeled actuator performance for a given trial host workload including random reads of 64 KB over an available data capacity for a disk drive.

FIG. 4A models a disk drive without actuator prepositioning where positioning happened instantaneously or the delay from the host for a replacement command was sufficiently slow to allow a non-instantaneous actuator positioning to occur.

FIG. 4B models a disk drive using actuator prepositioning where the host delay of a follow-on command is large enough for the actuator prepositioning to occur (additional approximate 6 ms in this example). The target location for the disk drive of FIG. 4B was determined as the middle of a range for a total available data capacity of disk 200, i.e., 50% LBA capacity.

As shown in the table below, there was approximately a 3.5% improvement in input/output operations per second (78.5 IOPS vs. 75.9 IOPS) and a lower average seek time for the disk drive of FIG. 4B using actuator prepositioning. Accordingly, actuator prepositioning as disclosed herein ordinarily allows for improved disk drive performance with a lower average seek time.

| | IOPS @ 45-us Avg Intercommand Time | IOPS @ 6-ms Avg Intercommand time | Avg-Seek-Time (ms) | Avg-Latency (ms) | AvgDisk-Transfer-Time (ms) | Avg-NonQueued-CCT (ms) | Avg-Seek-Distance (cylinders) | Missed-Rev-Rate (%) |
|---|---|---|---|---|---|---|---|---|
| Normal | 138.51 | 75.90 | 3.57 | 3.00 | 0.39 | 7.17 | 49540.04 | 1% |
| Seek to 50% LBA | 147.47 | 78.52 | 3.13 | 3.00 | 0.39 | 6.74 | 37020.17 | 1% |

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for positioning an actuator of a disk drive in communication with a host, the method comprising:
   determining a target location for prepositioning the actuator to a position expected to decrease a physical access time for a subsequent command from the host before receiving the subsequent command from the host, wherein the target location is determined based on at least one of a characteristic of the disk drive, recent command activity of the host, and information provided by the host; and
   moving the actuator toward the target location.

2. The method of claim 1, further comprising waiting a threshold period of time after performing a command received from the host before moving the actuator toward the target location.

3. The method of claim 2, wherein the threshold period of time is based on an average reduction in time to perform a command when the actuator is prepositioned before performing the command.

4. The method of claim 1, wherein the information provided by the host includes at least one logical block address for expected future commands and/or a priority for a type of data.

5. The method of claim 1, wherein the recent command activity of the host includes at least one of:
   a recent set of commands received from the host,
   commands received from the host that are queued for performance by the disk drive,
   whether recent commands received from the host are part of a data stream,
   scheduled background activity of the host, and
   location information for a set of recent commands received from the host.

6. The method of claim 1, wherein the characteristic of the disk drive includes at least one of:
   data capacity of the disk drive,
   a data capacity of a cache of the disk drive for storing data associated with commands received from the host,
   a total quantity of commands that can be queued by the disk drive before execution of the commands, and
   whether movement of the actuator toward the target location can be aborted before reaching the target location.

7. The method of claim 6, wherein the disk drive includes at least one disk for storing data and the target location is determined based on the data capacity of the disk drive such that the target location corresponds to a midpoint in a range for a total available data capacity or for a total previously written data capacity on the at least one disk.

8. The method of claim 1, further comprising:
   receiving a command from the host while the actuator moves toward the target location; and
   determining whether to abort moving the actuator toward the target location or to continue moving the actuator toward the target location.

9. The method of claim 8, wherein the disk drive includes a solid state memory for storing data and the method further comprises:
   determining to continue moving the actuator toward the target location if the received command is an isolated write command for storing data less than a predetermined size; and
   storing the data for the isolated write command in the solid state memory.

10. The method of claim 8, further comprising:
    determining whether performing the received command is a higher priority than prepositioning the actuator; and
    when it is determined that performing the received command is a higher priority than prepositioning the actuator:
       aborting movement of the actuator toward the target location;
       determining a new target location based on the received command; and
       moving the actuator toward the new target location.

11. A disk drive in communication with a host, the disk drive comprising:
    at least one disk for storing data;
    at least one head for reading data from and writing data to the at least one disk;
    an actuator for positioning the at least one head in relation to the at least one disk; and
    a controller configured to:
       determine a target location for prepositioning the actuator to a position expected to decrease a physical access time for a subsequent command from the host before receiving the subsequent command from the host, wherein the target location is determined based on at least one of a characteristic of the disk drive, recent command activity of the host, and information provided by the host; and
       command movement of the actuator toward the target location.

12. The disk drive of claim 11, wherein the controller is further configured to wait a threshold period of time after the disk drive performs a command received from the host before commanding movement of the actuator toward the target location.

13. The disk drive of claim 12, wherein the threshold period of time is based on an average reduction in time for the disk drive to perform a command when the actuator is prepositioned before performing the command.

14. The disk drive of claim 11, wherein the information provided by the host includes at least one logical block address for expected future commands and/or a priority for a type of data.

15. The disk drive of claim 11, wherein the recent command activity of the host includes at least one of:
   a recent set of commands received from the host,
   commands received from the host that are queued for performance by the disk drive,
   whether recent commands received from the host are part of a data stream,
   scheduled background activity of the host, and
   location information for a set of recent commands received from the host.

16. The disk drive of claim 11, wherein the characteristic of the disk drive includes at least one of:
   data capacity of the disk drive,
   a data capacity of a cache of the disk drive for storing data associated with commands received from the host,
   a total quantity of commands that can be queued by the disk drive before execution of the commands, and
   whether movement of the actuator toward the target location can be aborted before reaching the target location.

17. The disk drive of claim 16, wherein the controller is further configured to determine the target location based on the data capacity of the disk drive such that the target location corresponds to a midpoint in a range for a total available data capacity or for a total previously written data capacity on the at least one disk.

18. The disk drive of claim 11, wherein the controller is further configured to:
   receive a command from the host while the actuator moves toward the target location; and
   determine whether to abort moving the actuator toward the target location or to continue moving the actuator toward the target location.

19. The disk drive of claim 18, further comprising a solid state memory for storing data, and wherein the controller is further configured to:
   determine to continue moving the actuator toward the target location if the received command includes an isolated write command for storing data less than a predetermined size; and
   store the data for the isolated write command in the solid state memory.

20. The disk drive of claim 18, wherein the controller is further configured to:
   determine whether performing the received command is a higher priority than prepositioning the actuator; and
   when it is determined that performing the received command is a higher priority than prepositioning the actuator:
      abort movement of the actuator toward the target location;
      determine a new target location based on the received command; and
      command movement of the actuator toward the new target location.

* * * * *